United States Patent [19]

Flanagan et al.

[11] Patent Number: 4,860,611

[45] Date of Patent: Aug. 29, 1989

[54] ENERGY STORAGE ROTOR WITH FLEXIBLE RIM HUB

[76] Inventors: Ralph C. Flanagan, 42 Bearbrook Road, Gloucester, Ontario, Canada, K1B 3X8; Jimmy J. Wong, 2409-500 Laurier Avenue West, Ottawa, Ontario, Canada, K1R 5E1

[21] Appl. No.: 86,376

[22] Filed: Aug. 17, 1987

[30] Foreign Application Priority Data

Aug. 15, 1986 [CA] Canada ................................ 516037

[51] Int. Cl.⁴ ............................................. F16F 15/10
[52] U.S. Cl. ...................................... 74/574; 74/572; 23/159.3; 464/87
[58] Field of Search ................. 74/572, 573 R, 573 F, 74/574, 5; 474/196, 197; 29/159.3, 463, 159; 464/87, 89

[56] References Cited

U.S. PATENT DOCUMENTS

| | | | |
|---|---|---|---|
| 3,602,067 | 9/1969 | Wetherbee | 74/572 |
| 3,859,868 | 1/1975 | Post | 74/572 |
| 4,000,665 | 1/1977 | Rabenhorst | 74/572 |
| 4,036,080 | 7/1977 | Friedericy et al. | 29/159.3 |
| 4,098,142 | 7/1978 | Weyler | 74/572 |
| 4,176,563 | 12/1979 | Younger | 74/572 |
| 4,186,623 | 2/1980 | Friedericy et al. | |
| 4,244,240 | 1/1981 | Rabenhorst | |
| 4,266,442 | 5/1981 | Zorzi | 74/572 |
| 4,285,251 | 8/1981 | Swartout | |
| 4,341,001 | 7/1982 | Swartout | 74/572 |
| 4,370,899 | 2/1983 | Swartout | 74/572 |
| 4,443,727 | 4/1984 | Annen et al. | |
| 4,483,214 | 11/1984 | Mayer | |

FOREIGN PATENT DOCUMENTS

| | | | |
|---|---|---|---|
| 91519 | 12/1904 | Canada | |
| 0081968 | 6/1983 | European Pat. Off. | 74/574 |
| 2538719 | 6/1984 | France | 74/574 |

OTHER PUBLICATIONS

Evaluation of Filament-Wound Kevlar-49/Epoxy Fatigue Properties, Lawrence Livermore Laboratory, Subcontract #6691909, UCRL-15264, Final Report 80-17120, Jun. 3, 1980.

Miller, P. A., Marchand, M. P., and Flanagan, R. C., "Dynamic Response of High Speed, Fibre Composite Energy-Storage Rotors", Proceedings 8th Symposium on Engineering Applications of Mechanics, Jun. 1986, Sherbrooke, Canada, pp. 54–61.

Flanagan, R. C., "Design, Manufacture and Test Results for Four High Energy Density Fibre Composite Rotors", Proceedings, IECEC 86, 21st Intersociety Energy Conversion Engineering Conference, Aug. 1986, San Diego, Calif. pp. 901–907.

"High Energy Density Fibre Composite Rotors Design, Manufacture and Testing" vol. VIII for National Research Council of Canada by Energy Storage Rotor Research Team Department of Mechanical Engineering, University of Ottawa, Ottawa, Canada. Oct. 1986.

Primary Examiner—Vinh Luong
Attorney, Agent, or Firm—Howson & Howson

[57] ABSTRACT

An energy storage rotor (flywheel) used for kinetic energy storage has a unitary metallic hub having a plurality of spokes and a continuous rim integral with the spokes. A composite ring surrounds the rim. The rim is in a tight interference fit with the composite ring when at rest. Portions of the rim between the spokes are adapted to deflect outwardly under the influence of centrifugal force when in use to at least the same extent as the centrifugal force-induced expansion of the composite ring such that a tight fit between the rim and the ring is maintained at high rotor speeds.

5 Claims, 4 Drawing Sheets

FINITE ELEMENT MESH (ONE-EIGHTH SECTION) FOR FLEX RIM HUB

ROTOR DYNAMIC RESPONSE BODE PLOTS

ENERGY STORAGE ROTOR WITH FLEXIBLE RIM HUB

This patent generally relates to energy storage rotors (flywheels) used for kinetic energy storage and more specifically, to a high energy-density fibre composite rotor having a composite ring as well as a metallic hub which is designed to be radially compatible with the composite ring. Under dynamic operation, the rim sections between the spokes of the hub will flex to a greater extent than the radial growth of the composite ring structure to maintain positive contact between components.

The storage of energy in a high speed, light weight, fibre composite flywheel is one of the energy conservation technologies that was stimulated by the world oil crisis in the 1979's. While flywheels have traditionally been made of metal, such as high strength steel, recently it has been found that materials comprising composite fibres have much more suitable properties for energy storage rotor design.

The amount of kinetic energy stored in a rotor depends upon the mass moment of inertia and the angular velocity of the wheel. Energy storage thus varies proportionally to the first power of the mass moment of inertia and to the second power (the square) of the rotational velocity. The specific energy (energy stored per unit mass) is proportional to the stress-to-density ratio of the material. Therefore the best material for flywheel construction is a low density material which is extremely strong to withstand the stresses that are created at high rotational speeds. In other words, a high strength-to-density ratio is a principal requirement in the selection of a flywheel material. Fibre composite material, such as fiberglass, carbon or KEVLAR"aramid filament material (a trademark of E. I. Dupont de Nemours and Company) wound with a suitable resin binder provides a suitable strength to-density ratio.

Such composite fibre materials are much lower in density than steel, while being at least equally strong and far stronger in some cases. However, despite their superior strength, fibre composite rims are still subject to possibly destructive forces in the form of radial and hoop stresses produced by extremely high rotational velocities.

One known method for minimizing these stresses is disclosed in U.S. Pat. No. 4,285,251. This patent discloses a combination of ring layers of different fibres as a function of radius to achieve a variation in the modulus of elasticity and strength to equalize the effect of various unequal stresses. One optimum structure uses a bi-annular stacked thick ring that results in a low cost of manufacture due to being relatively low in labour intensity, yet offering excellent energy densities and low swept volumes.

Another advantage of the thick ring design is that the rotor can be designed to fail transversely (i.e. a circumferential crack) resulting in a safe or benign failure. As a result, containment apparatus can be of much lighter construction and the resulting rotor is much safer than previous designs.

One problem however with such composite rings is in the hub design. The problem is principally one of radial incompatibility, i.e. the high strength, moderately low modulus ring structure will grow radially under dynamic operation much more than any conventional hub, resulting in separation of the hub from the ring structure. Secondly the high strength, low density composite material rings require high speed operation to obtain effective energy storage and the higher density hub materials often fail structurally at such speeds.

One concept to overcome the above problems has been suggested in U.S. Pat. Nos. 4,036,080 and 4,186,623. The concept disclosed in these patents is an oversized four spoke hub inserted into a composite ring structure by flexing (squaring) the ring in a four point loading press. Under dynamic operation, the ring will remain in contact with the hub until it becomes circular. The point at which the ring becomes circular is designed to be above the operating speed of the rotor. One problem with this hub design is that it greatly restricts the composite ring design and requires a flexible ring. In U.S. Pat. No. 4,186,623, the ring structure is made up of a large number of very thin rings interfaced with a TEFLON polytetrafluoroethylene membrane. As a result, the ring structure is labour intensive and costly to the manufacturer. The ring structure is itself thin which results in poor volumetric efficiencies. Furthermore this particular type system cannot be used for thick ring rotor designs.

Another problem that is prevalent in hub designs is that the rotor, in achieving operating speeds, must pass through a critical frequency at which the hub and ring vibrate relative to each other. This critical frequency is a function of the a natural frequencies of the different components that make up the rotor. This vibration could result in destruction of the system if permitted to continue. In practice this frequency is passed through as quickly as possible to avoid vibrational buildup. The critical frequency is seldom a problem with conventional metallic (solid) rotors; however, it is an important problem in composite rotors.

Numerous other hub designs have been suggested though none of these have been radially compatible with a composite ring structure while retaining component concentricity and dynamic stability (i.e. torsional, axial and radial stiffness).

SUMMARY OF THE INVENTION

Accordingly, the invention herein comprises an energy storage rotor comprising an outer composite ring structure shrink fitted to a metallic hub having spokes such that the rim section between the spokes will tend to flex under dynamic operation to at least the same extent as the radial growth of the composite rim structure. As a result of the radial growth of the hub rim structure, positive contact between the hub and the ring is assured at all speeds of operation. The radially expanding hubs incorporated into the flywheel rotors herein result in a fairly flexible system that also maintains contact between the composite ring and the metallic hub throughout all speeds of operation.

Another advantage of this invention is that the rotor behaves as a conventional metallic (solid) rotor at low speeds. As the speed of the rotor increases, a portion of the ring will lift off of the hub rim at the points where the spokes join the rim. At this point however the rotor has already achieved a substantial speed that is well above the critical frequency of the hub-ring components and therefore the rotor does not pass through a potentially destructive critical frequency in achieving operating speed.

The avoidance of vibration at the critical frequency is achieved due to a combination of a tight thermal (shrink) fit between the right and the hub, and the ability of the rim to flex. This combination permits the rotor to act like a solid metallic rotor at low speeds where the critical frequency would otherwise be encountered without the tight thermal fit and also permits the hub and rim to remain in frictional contact at higher speeds.

BRIEF DESCRIPTION OF THE DRAWINGS

Details of preferred embodiments of the invention are described by reference to the accompanying drawings.

DETAILED DESCRIPTION OF PREFERRED EMBODIMENTS

In the following descriptions, the corresponding elements as shown in each figure of the drawings are given the same reference number.

Figure 1:
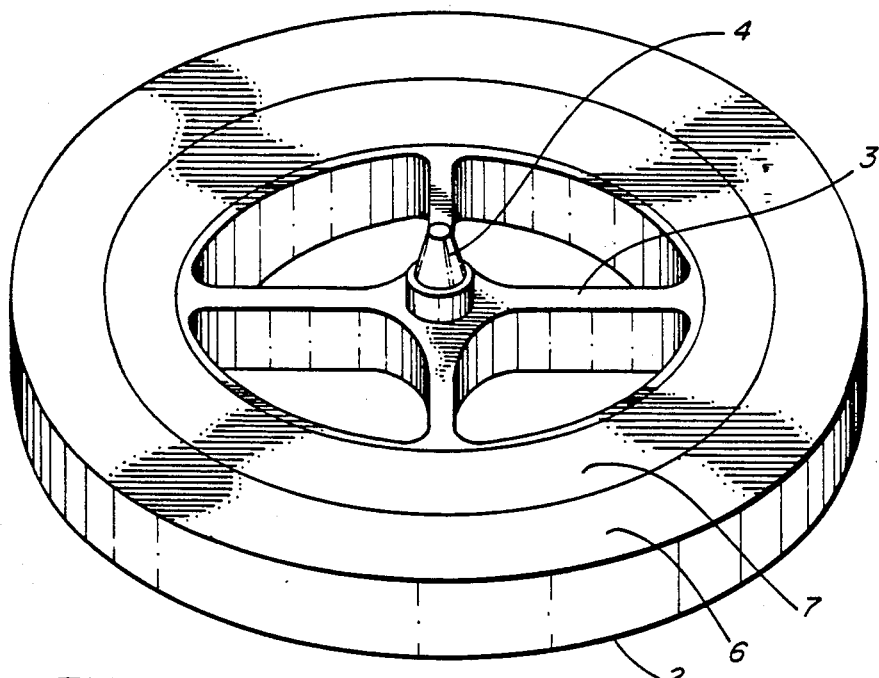
FIG. 1 is a perspective view of a flex rim hub rotor assembly.

In FIG. 1 of the drawings the flywheel rotor assembly includes a bi-annular composite ring 2, and an expanding unitary metallic hub 3. In addition also shown in the axle 4. The bi-annular composite ring 2, uses a E/XAS carbon, wet filament wound, fibre composite outer ring, 6, interference fit to an S2-glass inner ring 7. The ring assembly is put together with a thermal fit.

Figure 4:
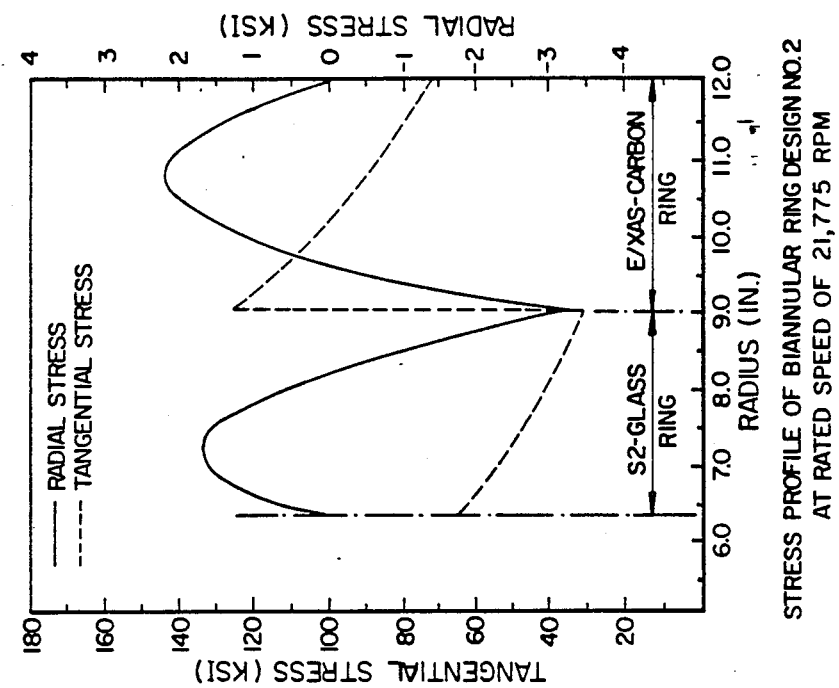
FIG. 4 is a graph of the stress profile of a second bi-annular ring at a rated speed of 21,775 rpm.
Figure 3:
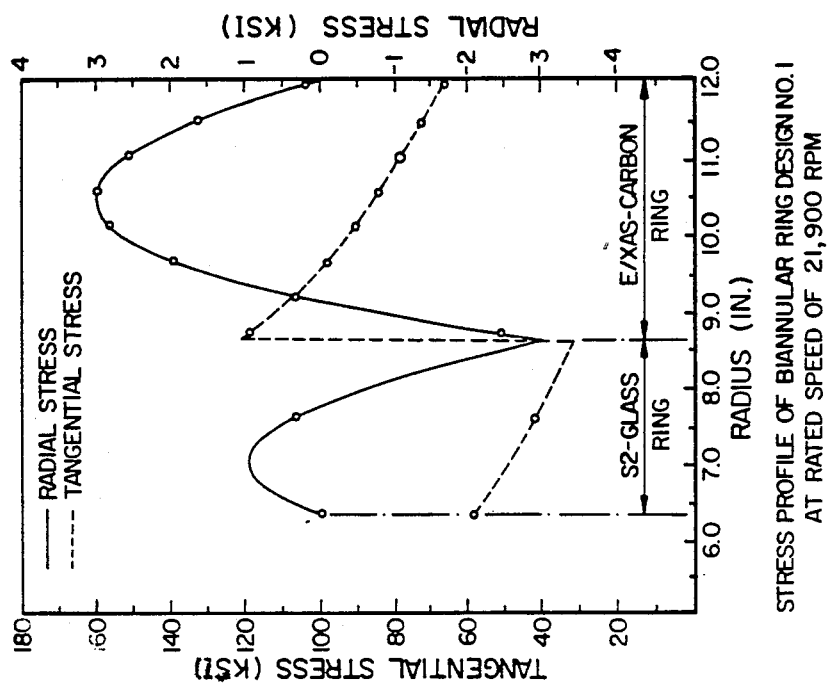
FIG. 3 is a graph of the stress profile of a bi-annular ring at a rated speed of 21,900 rpm.

Two ring designs were employed. Ring design 1 uses a 2.0 ksi (12.8 mpa) inter ring interfacial pressure, while design 2 uses a 2.25 ksi (15.5 mpa) interfacial pressure with a somewhat thicker S2-glass ring. FIGS. 3 and 4 show the stress profiles for the ring designs at operating speed. Both of the rotors are designed for 100,000 cycles and hence, offer significant overspeed capability. Under such conditions ring design 1 should reach 29,200 rpm (2.37 kilowatt-hours) while design 2 should have an ultimate speed of 32,250 rpm at which point it would store 2.93 kilowatt hours of energy (37.2 watts per pound; 82.1 watts/kg).

The S2-Glass and E/XAS-carbon composite rings 6, 7 were manufactured using wet filament winding and a two stage high temperature cure process. The bi-annular rings 2 were manufactured and thermally assembled by cooling the rings to achieve the design interfacial pressure of 2.0 ksi for ring design number 1, or 2.25 ksi for ring design no. 2.

While the bi-annular composite ring is a preferred embodiment of this invention, the composite ring could consist of a number of rings or materials or combination of rings and materials, from single material single ring to multi-material multi-ring composite rings. The bi-annular ring however offers advantages in being cost effective.

Figure 5:
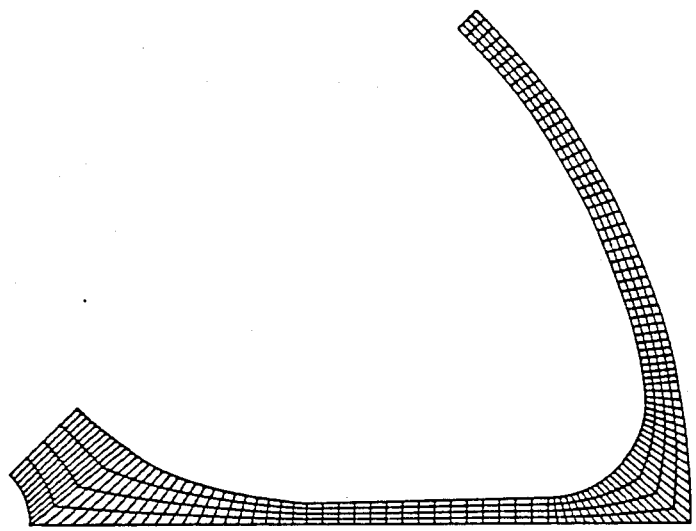
FIG. 5 is a finite element mesh (one-eighth section) of a four spoke hub.

The metallic flex rim hub is designed to be compatible with either ring design and uses a 7075-T651 aluminium flex rim hub. The hub shown in FIGS. 1, 2 and 5 has 4 spokes, though alternatively 2, 3, 5 or more spokes may be used as long as the hub expansion equals or exceeds the ring expansion. The flux rim hub can be assembled concurrently with the rings or later by cooling the hub only, then inserting with the ring and achieving the necessary thermal fit.

The design of the metallic hub 3 was carried out using computer assisted design employing a finite element analysis program that calculates the stress, flexing and displacement of the hub throughout the operating speeds. The analysis calculates the stress and displacement at each node of a finite element mesh shown in FIG. 5.

Variations in the geometry of the hub design were analyzed, which resulted in a design wherein the rim is thinner in the centre portion between the spokes.

Figure 2:
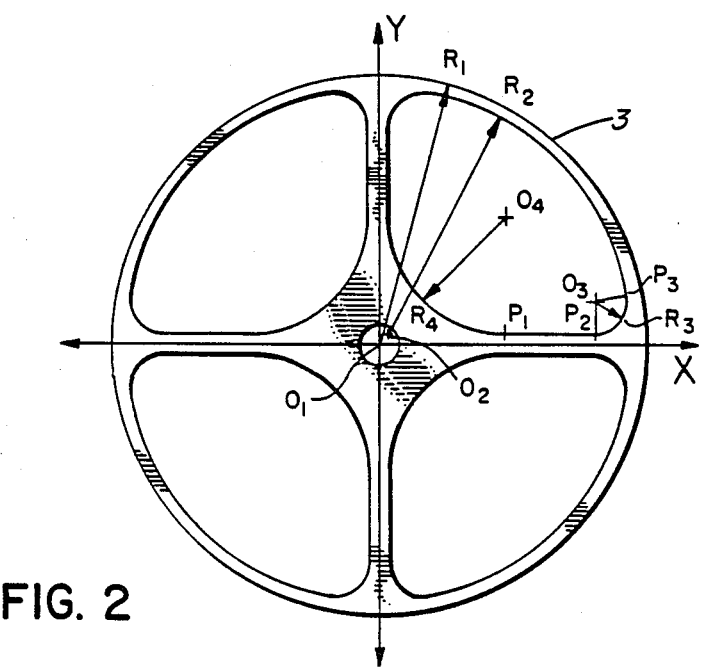
FIG. 2 is a top of the flex rim hub.
Figure 1A:
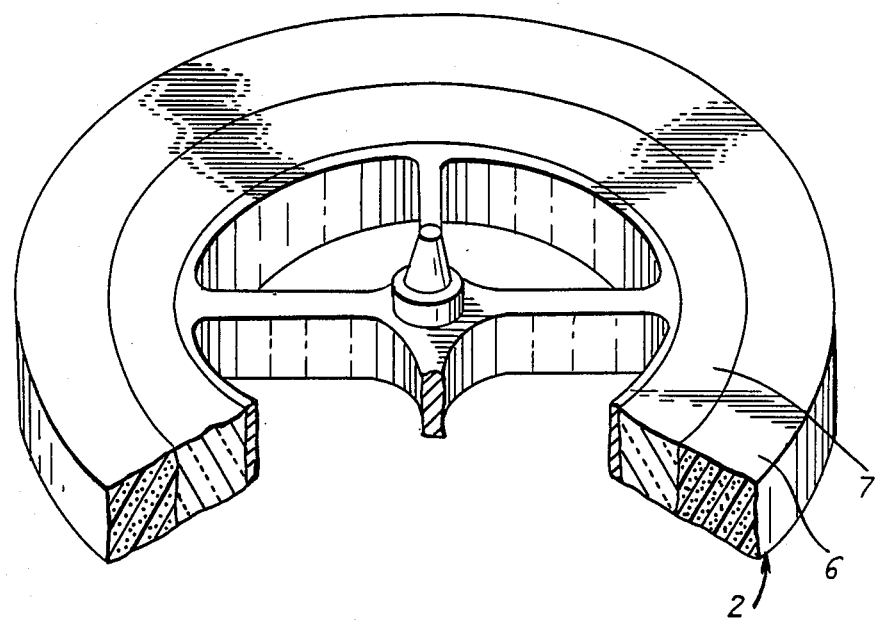
FIG. 1A is a view of a portion of the rotor assembly shown in FIG. 1 and broken away to show the cross-section of the several components.

As shown in FIG. 2, a thinning of the rim can be achieved by having the axis $O_2$ for the inside radius for each rim portion being offset from the centre $O_1$ of the rotor.

After assembly, final balancing of the assembled rotors should be carried out. The balance procedure includes a static imbalance and a moment imbalance corrections. Balance correction weights can be easily attached between the spokes on the inside face of the hub-rim, which is an advantage of this hub design. Once balanced the flywheels retained balance and achieved dynamic repeatability and ease of balancing.

Figure 6:
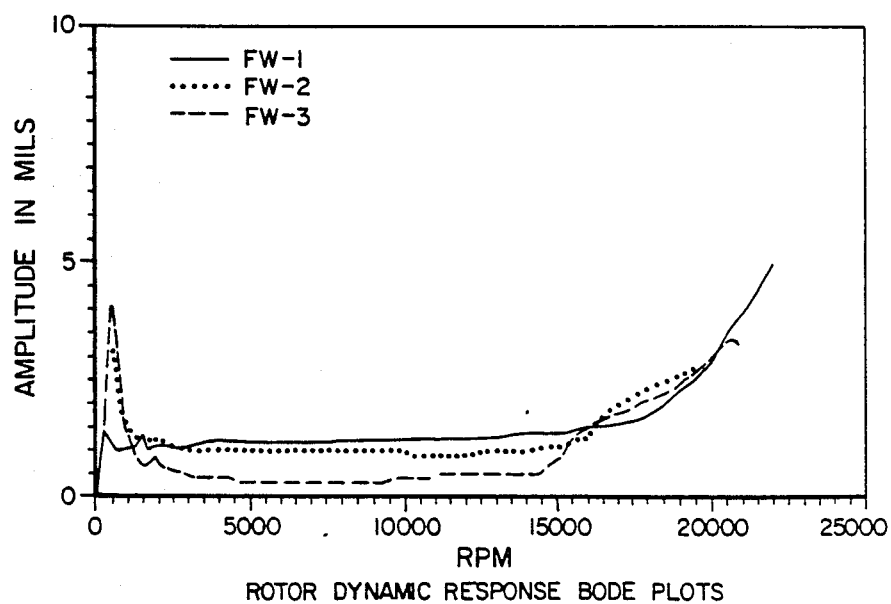
FIG. 6 shows rotor dynamic response bode plots.

FIG. 6 presents the bode plots for three rotors built in accordance with the invention. Generally the rotors showed a classical dynamically stable rotor response to their design speed. The three rotors all showed a flat response to about 15,000 rpm with a slight increase (linear with speed) in amplitude of vibration appearing thereafter and rising to about 4 mils at maximum rotor speed. This slight amplitude growth is likely due to hub ring interfacing at high speeds since a precision balance and retention of balance was shown to exist for these rotors. In use, the aluminum hub design permits the rim section between the spokes to flex under dynamic operations, to an extent equal to or greater than the radial growth of the composite rim structure. This flexing provides positive contact between components at all speeds of operation. The advantage of the expanding hub design is that there is no relative motion or shift between any of the components and, therefore, there is no wear or tolerances to be lost through wear.

EXAMPLE 1

A bis-annular composite ring was constructed employing an S2-glass inner ring thermally fit to an E/XAS outer ring. The outside diameter was 24.00 in. (60.96 cm) with an interface diameter of 17.246 in. (43.805 cm) and an inside diameter of 12.650 in. (32.131 cm). The ring had an inter-ring interfacial pressure of 2.0 ksi (13.8 mpa). The ring had an axial thickness of 3.45 in. (8.76 cm), a weight of 78.0 lbs. (35.4 kg) and a swept volume of 1561 in$^3$ (25,567 cm$^3$).

The design speed of the ring is 21,900 rpm resulting in a potential stored energy of 1.33 kw/hr. The energy density is 17.1 wh/lb (37.7 wh/kg). The cycle life is 10 cycles with a tested operation temperature between $-40°$ to $100°$ C.

The ring is designed for an ultimate speed of 29,200 rpm with the failure mode being a transverse failure in the E/XAS ring. The ultimate stored energy is 2.37 kw/hr and the ultimate energy density being 30.4 wh/lb (67.0 wh/kg).

EXAMPLE 2

A second bi-annular composite ring was constructed employing an S2-glass inner ring thermally fit to an E/XAS outer ring. The outside diameter was 24.00 in. (60.96 cm) with an interface diameter of 18.040 in. (45.822 cm) and an inside diameter of 12.644 in. (32.116 cm). The ring had an inter ring interfacial pressure of 2.25 ksi (13.8 mpa) and an axial thickness of 3.45 in. (8.76 cm), a weight of 78.7 lbs. (35.7 kg) and a swept volume of 1561 cubic inches (25,567 cubic cm).

The design speed of the ring is 21,775 rpm resulting in a potential stored energy of 1.33 kw/hr. The energy density is 17.0 wh/lb (37.7 wh/kg) and a cycle life of $10^5$ cycles, with a test operating temperature between $-40°$ to $100°$ C.

The ring is designed for an ultimate speed of 32,250 rpm with the failure mode being a transverse failure in the E/XAS ring. The ultimate stored energy is 2.93 kw/hr and the ultimate energy density being 37.2 wh/lb (67.0 wh/kg).

EXAMPLE 3

A flywheel rotor was constructed using a flex rim hub made of 7075-T651 aluminium which was thermally fit to the ring designs of Example 1 and Example 2. The flex rim hub can be assembled concurrently with the assembly of the bi-annular rings or later by cooling the hub only.

The dimensions of flex rim hub are set out below in Chart 1, with reference to the corresponding points shown in FIG. 2.

| Chart 2 | |
|---|---|
| Radii | dimensions (in) |
| $R_1$ | 6.3400 |
| $R_2$ | 5.7746 |
| $R_3$ | 0.8421 |
| $R_4$ | 2.7871 |

| Horizontal (x) and (y) distances measured in inches from Center 0, | | |
|---|---|---|
| Point | x | y |
| $O_1$ | 0.0000 | 0.0000 |
| $O_2$ | 0.2406 | 0.2406 |
| $O_3$ | 5.1041 | 1.0626 |
| $O_4$ | 3.0076 | 3.0076 |
| $P_1$ | 3.0076 | 0.2205 |
| $P_2$ | 5.1041 | 0.2205 |
| $P_3$ | 5.9354 | 1.2030 |

The two rotors were balanced with a slow-roll static-imbalance and moment-imbalance corrections as are well known to those skilled in the art. Once balanced, the flywheel showed no signs of mass shifting. The rotors showed a flow amplitude response (FIG. 5) to about 15,000 rpm with a slight increase (linear with speed) thereafter rising to about 4 mils at maximum rotor speed. This slight amplitude growth is likely due to hub/ring interfacing at these high speeds since pecision balance and retention of balance was shown to exist for these rotors.

In general, the rotors exhibited a stable and classical dynamic behaviour and the fit between the metallic hub and the bi-annular composite ring was maintained at all speeds.

Although specific embodiments of the invention have been disclosed herein, it will now be apparent to those of ordinary skill in the art to which the invention pertains that many other embodiments of the invention may be constructed. Illustrative of such variation is the use of alternate materials and the use of substantially larger dimensions suitable to store tens of thousands of kilowatt hours of energy. It will also be obvious to those skilled in the art, that many other modifications, substitutions, combinations and procedures may be used within the scope and spirit of the invention in addition to those specifically recited above. It is intended by the claims which follow to cover these and all other obvious alternatives and variations.

We claim:

1. An energy storage rotor comprising a unitary metallic hub defining a center of rotation, said hub having a plurality of spaced apart spokes and a continuous rim to which said spokes are integrally connected at spaced apart locations, and a composite ring surrounding said rim, wherein said rim is in a tight interference fit with the composite ring at rest and behaves essentially as a solid body at lower rotational speeds, and wherein those portions of the rim disposed between said spokes are adapted to deflect radially outwardly under the influence of centrifugal force when in use at higher rotational speeds so as to follow the centrifugal force-induced radial expansion of the composite ring surrounding the rim such that at said higher rotational speeds portions of said composite ring can lift away from the rim of the hub at said locations where said spokes are connected to said rim and so that a tight fit between the rim and the ring is maintained at all operating speeds of the rotor and further wherein said rim portions between said spokes define respective radially inwardly directed curved surface portions each having a center of curvature which is located radially outwardly of said center of rotation such that each of said rim portions becomes thinner toward a central portion between adjacent said spokes.

2. A rotor as claimed in claim 1 wherein the composite ring is bi-annular.

3. A rotor as claimed in claim 2 wherein the composite ring is composed of a S2-glass inner ring and a carbon filament outer ring.

4. A rotor as claimed in claim 1 wherein the metallic hub is composed of aluminium.

5. A rotor as claimed in claim 4 wherein the hub has four spokes.

* * * * *

UNITED STATES PATENT AND TRADEMARK OFFICE
CERTIFICATE OF CORRECTION

PATENT NO. : 4,860,611

DATED : August 29, 1989

INVENTOR(S) : Flanagan et al.

It is certified that error appears in the above-identified patent and that said Letters Patent is hereby corrected as shown below:

At Column 3, line 67, "flux" should read --flex--.

At Column 4, line 46, "bis-annular" should read --bi-annular--.

At Column 4, line 57, "10" should read --$10^5$--.

Signed and Sealed this

Seventh Day of August, 1990

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,860,611
DATED : August 29, 1989
INVENTOR(S) : Flanagan et al.

It is certified that error appears in the above-identified patent and that said Letters Patent is hereby corrected as shown below:

At Column 2, line 68, "right" should read --ring--.

At Column 5, line 52, "flow" should read --flat--.

Signed and Sealed this

Twenty-fifth Day of September, 1990

Attest:

HARRY F. MANBECK, JR.

*Attesting Officer*          *Commissioner of Patents and Trademarks*